United States Patent [19]  [11] Patent Number: 4,643,044
Bitton  [45] Date of Patent: Feb. 17, 1987

[54] CLAMPING OF MACHINE CASINGS FORMED FROM AT LEAST TWO PARTS ONE OF WHICH IS MADE FROM A METAL OF RELATIVELY LOW HARDNESS

[75] Inventor: Georges Bitton, Oullins, France
[73] Assignee: Rexroth-Sigma, France
[21] Appl. No.: 721,449
[22] Filed: Apr. 9, 1985
[30] Foreign Application Priority Data
  Apr. 10, 1984 [FR] France ............... 84 05651
[51] Int. Cl.[4] ......................... F16H 57/02
[52] U.S. Cl. ..................... 74/606 R; 277/97; 277/236
[58] Field of Search ............... 74/606 R; 277/97, 236
[56] References Cited
  U.S. PATENT DOCUMENTS
  4,061,413 12/1977 Keller ................... 277/236
  4,196,913 4/1980 Oka ..................... 277/236
  4,335,890 6/1982 Nicholson .............. 277/236

Primary Examiner—Albert J. Makay
Assistant Examiner—David W. Westphal
Attorney, Agent, or Firm—Larson & Taylor

[57] ABSTRACT

The machine casing (1) comprises at least two casing parts (2; 3, 4) assembled mechanically together by clamping members (5, 6), the two casing parts being both made from metal, one at least (2) of these two casing parts (first part) being subjected to deforming forces likely to cause relative micromovements of the two opposite faces of these two casing parts, said first part (2) being made from a metal of relatively low hardness. Between the opposite faces of the two casing parts is inserted a plate (7) corresponding to the contour of the opposite faces of the two casing parts but having an area substantially less than that of the surface of said opposite faces of the two casing parts; the plate (7) is made from a metal of a hardness greater than that of a metal forming said part (2) and the corresponding edge (8;9) of the plate is sufficiently sharp to bite into the metal of relatively low hardness.

6 Claims, 1 Drawing Figure

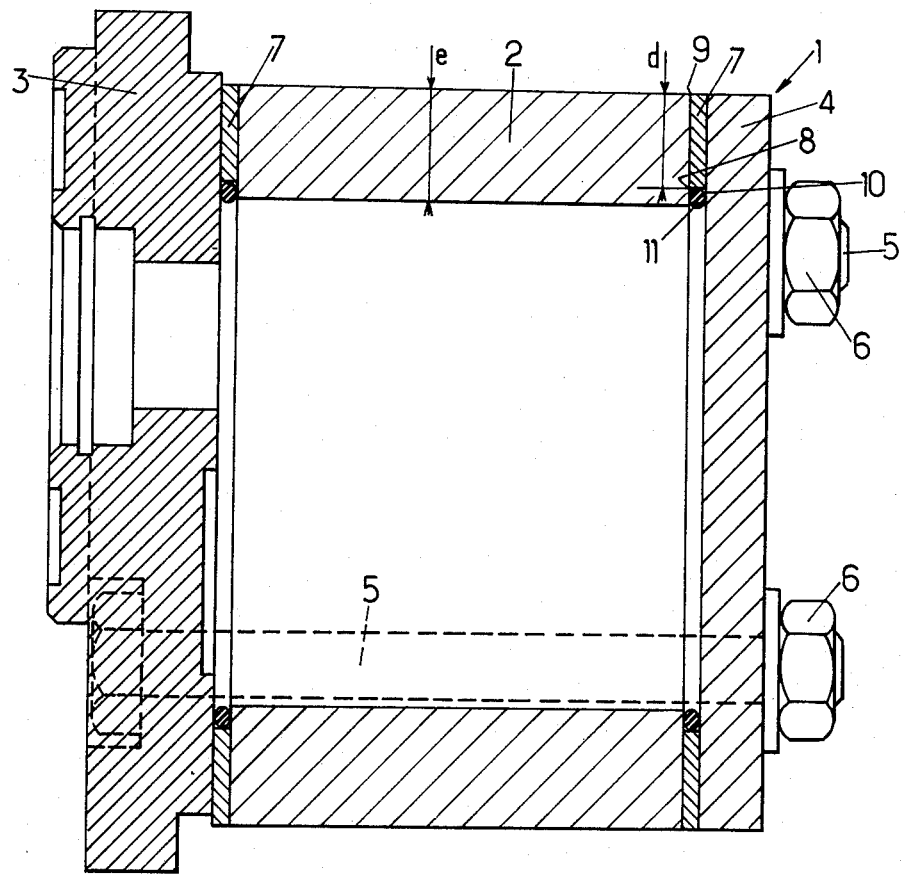

CLAMPING OF MACHINE CASINGS FORMED FROM AT LEAST TWO PARTS ONE OF WHICH IS MADE FROM A METAL OF RELATIVELY LOW HARDNESS

The present invention relates to improvements to the clamping of machine casings comprising at least two casing parts (for example a central casing body and an end flange) assembled mechanically together by clamping members, the two casing parts being both made from metal, one at least of these two casing parts (first part) being subjected to deforming forces likely to cause relative movements of low amplitude (micromovements) of the two opposite faces of these two casing parts, said first part being made from a metal of relatively low hardness.

At the present time, the general practice is to form machine casings by assembling a central casing body made from cast metal or an aluminium alloy obtained by casting with one or more other parts, such as end flanges, made from a relatively harder metal (for example from steel) than the preceding ones, the flanges and the central body being assembled together by bolting.

In particular, when the machine enclosed in the casing is operating rhythmically, high stresses (which may reach several tons) may, for some machines, be exerted on the component parts of the casing, either because of the mechanical reactions, or because of the high internal pressures. The result is an alternating deformation of the casing body and alternating bending of the flange or flanges, which causes, at the level of the contacting surfaces of the casing body and of the flanges, relative movements of very small amplitude which are generators of corrosion ("fretting corrosion") destroying these contacting surfaces. This phenomenon tends to accelerate the relaxation of the assembly members (screw or bolt).

The aim of the invention is essentially to overcome this problem, in so far as it is possible and to provide an arrangement which allows more particularly the working life of machine casings to be extended in a simple and inexpensive way.

For this, in accordance with the invention, between the opposite faces of the two casing parts, is interposed a plate matching approximately the contour of the opposite faces of the two casing parts, but having an area substantially less than that of the surface of said opposite faces of the two casing parts, the plate being made from a metal of a hardness higher than that of the metal forming said first part and the corresponding edge of the plate being sufficiently sharp to bite into the metal of relatively low hardness.

Experience has proved that the casing of a hydraulic gear pump, equipped in accordance with the invention has its working life increased in astonishing proportions.

The applicant thinks that, on the one hand, the suppression of any recess or groove in the casing appreciably prevents weakening of the casing, and that in addition with the metal plate biting into the relatively soft resiliently deformed metal forming the first casing part (for example the central body of the casing), the edge of the plate thus encrusted in the relatively softer metal provides sufficient anchorage for preventing the very low amplitude transverse movements of this first casing part. The improvement of the binding of the casing leads to a greater resistance in time of the different components parts. The casing may withstand a number of applications of alternating forces several times (three times, even five times) greater than that that conventionally designed casings could withstand.

In addition, the special geometric configuration conferred by the presence of the plate sandwiched between the two opposite faces of the two casing parts leads, in the case where it is desired to provide sealing of the assembly of different parts, to considering the groove thus formed as capable of receiving a sealing joint, the thickness of the plate being determined depending on the thickness of the seal. Such an arrangement is particularly advantageous for it avoids the need to machine a groove adapted to receive said seal in one of the opposite faces.

The invention will be better understood from reading the detailed description which follows of one embodiment of the invention given by way of example for a particular application; in this application reference is made to the accompanying drawings in which the single FIGURE is a side view in section of a casing constructed in accordance with the invention.

Casing 1 (which is for example that of a gear pump) comprises a central casing body 2 made from aluminium alloy or cast metal and two end flanges 3 and 4 respectively, formed for example from steel. Tie rods, formed by threaded rods and bolts 6, ensure the assembly of the component parts of the casing.

For the sake of clarity of the Figures and to simplify the description, the parts of the machine disposed inside the casing have not been shown.

In accordance with the invention, between the casing body 2 and flange 3, on the one hand, and between the casing body 2 and flange 4 on the other, have been inserted respectively two plates 7 formed from a harder metal than the metal forming the casing body 2; the plates 7 are advantageously stamped out from a steel sheet.

In order to be able to fulfill its role, each plate 7 is stamped so as to take on approximately the form of the contacting surface of casing body 2 with the corresponding flange 3 or 4, with however a cross dimension D substantially less than the corresponding cross dimension or thickness e of the casing body 2. The difference between the two dimensions d and e may be situated on a single side (for example towards the inside of the casing in the example shown): in this case the edge 8 of plate 7 which is sharp, is able to bite into the metal of the casing body 2 and thus to lock the side wall of said body against any radial movement, particularly outwardly.

Of course, the difference between dimensions d and e may be distributed on each side of plate 7 (i.e. inwardly and outwardly of the casing): in this case not only edge 8 but also the opposite edge 9 of plate 7 may bite into the metal forming the casing body 2; the anchorage phenomenon is correspondingly improved and any movement of the side wall of the casing body is prevented not only inwardly but also outwardly.

The arrangement of the invention provides an additional advantage when, as is the case in the example considered a sealed assembly of the component parts of the casing is desired.

Because of the recessing of the edge of plate 7 with respect to the internal face of the casing body, the adjacent faces of the casing body 2, of flange 3 or 4 and plate 7 define a groove 10 inside which may be nipped a sealing joint 11, as shown in the FIGURE. The seal is then simply positioned during assembly of the component parts and there is no longer need to machine a seal groove in one or other of the opposite faces of the casing body 2 or of flange 3 or 4, as was the case before. The manufacturing cost of the casing is correspondingly reduced.

As is evident and as it follows moreover already from what has gone before, the invention is no wise limited to those of its modes of application and embodiments which have been more especially considered; it embraces, on the contrary, all variants thereof.

I claim:

1. A machine casing comprising at least first and second body parts, which parts are assembled together by machanical clamping means with opposing faces of the two body parts facing each other, at least a first body part which is subjected to deforming forces during operation of the machine, which forces are likely to cause micromovements of the said opposing faces, the first body part being made from a metal of relatively low hardness, a plate having flat surfaces on both sides tightly clamped in position between said opposing faces of the two body parts, the area of said plate on its flat sides generally approximating the shape of the said opposing faces, but being substantially less than the area of the surfaces of the said opposing faces of the two body parts, at least one edge of the plate which is located against the first body part being relatively sharp, and the plate being made from a metal which is of a hardness greater than that of the metal forming said first body part, such that the said sharp edge of the plate bites into the relatively low hardness material of the first body part so as to avoid the micromovements and the resultant local corrosion and the consequent slackening of the mechanical clamping means.

2. A machine casing according to claim 1, wherein the first body part is made from cast metal and the plate is made from steel.

3. A machine casing according to claim 1, wherein the first body part is made from an aluminum alloy and the plate is made from steel.

4. A machine casing according to claim 1, wherein a groove is defined by portions of the opposing faces which do not engage the plate, and including a sealing joint in said groove.

5. A machine casing according to claim 4, wherein the first body part is made from cast metal and the plate is made from steel.

6. A machine casing according to claim 4, wherein the first body part is made from an aluminum alloy and the plate is made from steel.

* * * * *